May 5, 1959   R. L. BRIGHT ET AL   2,885,570
TRANSISTOR POWER CONTROL CIRCUITS
Filed April 5, 1954                           2 Sheets-Sheet 1

WITTNESS:
E. A. M'Closkey.
John B. Davidson

INVENTORS
Richard L. Bright
and George H. Royer.
BY
Paul E. Friedemann
ATTORNEY

May 5, 1959   R. L. BRIGHT ET AL   2,885,570
TRANSISTOR POWER CONTROL CIRCUITS
Filed April 5, 1954   2 Sheets-Sheet 2

United States Patent Office 2,885,570
Patented May 5, 1959

2,885,570

TRANSISTOR POWER CONTROL CIRCUITS

Richard L. Bright, Adamsburg, and George H. Royer, Pittsburgh, Pa., assignors to Westinghouse Electric Corporation, East Pittsburgh, Pa., a corporation of Pennsylvania Application April 5, 1954, Serial No. 420,904

2 Claims. (Cl. 307—88.5)

This invention relates to electronic switching devices for coupling an electrical supply source to a load, and more particularly to electronic switching devices making use of transistor means as the active coupling and decoupling element.

The control of the flow of power from an electrical supply source to a load associated therewith has previously been accomplished by mechanical circuit breakers or by electronic devices such as thyratron systems, and regulating generators. With the advent of the transistor as a new type of electronic circuit element, suggestions have been made that this device also be used in the field of power control inasmuch as the use of thermionic tubes and moving parts of other devices would be eliminated thereby.

It has previously been known that current flow through a transistor might be reduced to a very low value by open-circuiting the base (or control electrode) thereof from the emitter and from the collector, and that a relatively large current flow may be established by directly connecting the base to the collector. A circuit utilizing the above-described principles of operation to control bidirectional current flow has been described in the article, "Control Application of the Transistor" by E. F. W. Alexanderson, appearing in Proc. I.R.E., vol. 40, No. 11, pages 1508–1511.

A number of very serious shortcomings are apparent in this particular circuit described in the article. First— If it is desired to reduce current flow from an A.C. source to a load, a relatively large "deflector" current is required to flow through the control circuit in order to effectively open-circuit the base of the transistor from the other electrodes thereof. Inasmuch as this deflector current also flows through the load, the minimum current through the load may be quite large; for efficient utilization of the transistor, the minimum current may be required to be as much as one-third of the full load current. Second—The control source is required to furnish considerable driving power to force the deflector current through the load. This driving power may be as much as one-fifth of the power controlled by the circuit. Third— The ratio of forward-to-back impedance of the transistor is seldom greater than three hundred to one using the control system described by Alexanderson. When the ratio of forward-to-back impedance is this low, it is obvious that considerable leakage current may pass through the transistor under minimum load conditions, although in this particular instance the magnitude of the "deflector" current passing through the load is so great as to mask the effect of leakage current.

One object of this invention is to provide a control circuit for a transistor used as a switching device in power-control applications, wherein the minimum load current is a very small fraction of the full load current.

Another object is to provide a control circuit for a transistor used as a switching element wherein the forward-to-back impedance of the transistor element is at least one hundred thousand to one.

A further object is to provide a transistor electrical switch requiring very little actuating power.

A still further object is to provide an electrical switch making use of a transistor as the active switching element wherein the minimum load current is zero for all practical purposes.

Still another object is to provide an electrical switch making use of a transistor as the active switching element wherein the voltage drop across the transistor is kept small.

Other objects and features of the present invention will become apparent upon consideration of the following detailed description thereof when taken in connection with the accompanying drawings. It is to be expressly understood, however, that the drawings are designed for purposes of illustration only and not as a definition of the limits of the invention. In the drawings.

Figure 1:
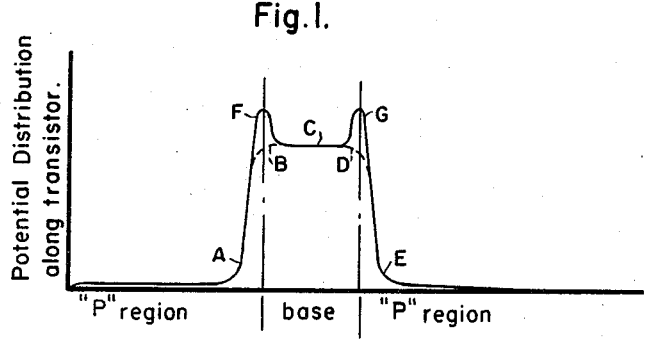
Figure 1 illustrates transistor potential distribution curves useful in the understanding of our invention.

The operation of this invention will be best understood upon consideration of the circuit diagrams of Fig. 2 when taken in connection with the potential distribution curves shown in Fig. 1. With reference first to Fig. 1, the portions of the potential distribution curve designated A, B, C, D and E represent the distribution of potential along a p–n–p type transistor having a "floating" base (i.e., a base not connected to the emitter or collector through external circuitry). It can be seen that as the junction between either the "p" region and "n" region is approached, there is a sudden increase of potential in the immediate vicinity of the junction. The potential reaches a maximum in the center of the "n" region, but is substantially constant except in the immediate vicinity of the junctions of the "p" and "n" regions.

Figure 2A:
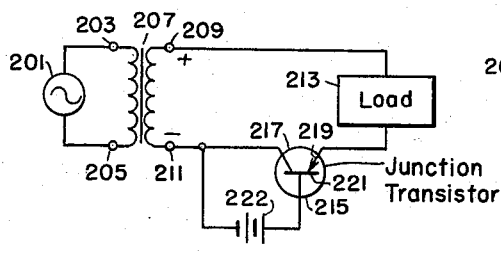
Figs. 2a, 2b, 2c and 2d are circuit diagrams picturing various conditions for current cut-off and current conduction through a transistor according to our invention.

If a battery is connected between the base and one "p" region with the positive terminal therof connected to the base, as shown in Fig. 2a, it will be found that the potential at the junction of the "p" and "n" regions, instead of following the B or D portions of the potential distribution curve, will follow the portions of the curve labeled F. It will be observed that the potential reaches a pronounced peak at the junction of the base region and the "p" region to which the base is connected, and that the potential between these peaks is essentially the maximum potential observed when the base was "floating." The reason for this phenomenon is that a contact potential exists between the "p" and "n" regions that is neutralized by an accumulation of electrons in the immediate vicinity of the junction of the "p" and "n" regions when the base is floating. The battery or short circuit connection drains these electrons from the portion of the end region at the junction; the contact potential, no longer being neutralized, is superimposed upon the inherent potential of the semiconductive material at the junction.

Figure 2B:
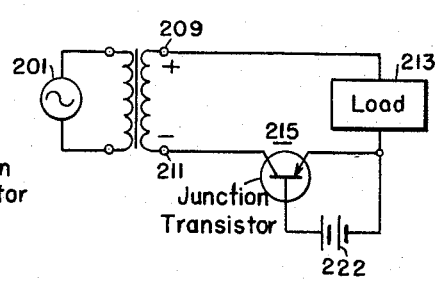

The same effect will be noted if the battery is similarly connected between the base and the other "p" region as shown in Fig. 2b. The potential distribution curve in this case includes the portion labeled "G."

With reference now to Fig. 2a, there is depicted an A.C. source 201 coupled to a load 213 by means of transformer 207 and transistor 215. The A.C. source 201 is connected directly across the primary terminals 203 and 205 of transformer 207; load 213 and transistor 215 are serially connected across transformer secondary terminals 209 and 211. Transistor collector 217 is joined to terminal 211, and one side of load 213 is joined to terminal 209. The other side of load 213 is directly connected to transistor emitter 219. Control potential source 222 is connected between transistor base 221 and collector 217; the positive terminal of battery 222 is connected to base 221. Control potential source 222 is preferably of the reversible-polarity type, such as a D.C. source connected across the switch terminals of a cross-connected D.P.D.T. switch, or a rectangular-wave generator such as a multivibrator, but for convenience of explanation is shown as a D.C. battery.

Assuming first that the base is open circuited, and that terminal 209 is positive with respect to terminal 211, then there will be a certain amount of current conduction through the transistor inasmuch as positive charges (or "holes") that are responsible for current conduction in a p-n-p transistor are able to overcome the potential barrier interposed by the portion of the distribution curve labeled C (Fig. 1) to a limited extent. With battery 222 connected in the circuit, a considerably higher potential barrier will be set up as in the G region of the distribution curve, as has previously been described. The potential of battery 222 must be greater than the potential between terminals 209 and 211 so that base 221 is at a positive potential with respect to both emitter 219 and collector 217 to prevent the passage of current from terminal 209 through the load, the emitter, the base, and battery 222 to terminal 211. The electrons at the junction of the base and collector regions being drained away from the base, the contact potential between base and collector will be effective to almost entirely cut-off current conduction through the transistor.

The effect described immediately above also will be noted when the battery 222 is connected between base and emitter as illustrated in Fig. 2b. In this case, the contact potential depicted in the F portion of the potential distribution curve of Fig. 1 will come into play to substantially increase the barrier to current flow across the junction of the base and emitter regions.

Figure 2C:
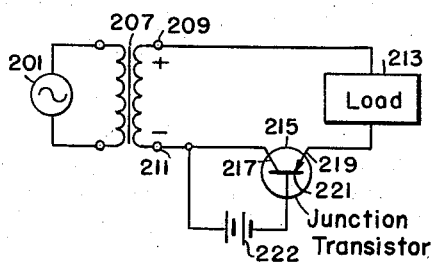
Figure 2D:
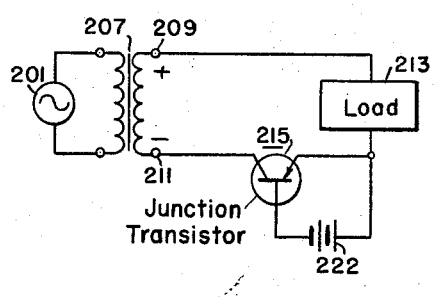

Figs. 2c and 2d depict the circuit connections for battery 222 that will bring about current saturation. By current saturation is meant that operation is at a sufficient base current to produce substantial emitter-collector current flow, under conditions where any further increase in the magnitude of the base current will have virtually no effect on the emitter-collector flow.

The circuit connections in these figures are essentially the same as those for Figs. 2a and 2b with the exception that battery 222 is connected between base and collector with the negative terminal thereof joined to the base. The potential of battery 222 in this instance need only be sufficient to insure saturation of the collector-emitter circuit. With this circuit arrangement, current will flow from terminal 209 through load 213, emitter 219, base 221 and battery 222 to transformer secondary terminal 211. Inasmuch as collector 217 is at a negative potential with respect to emitter 219, current will also flow from emitter to collector in accordance with the ordinary principles of transistor action. By suitably adjusting the potential of battery 222, current saturation may be easily effected.

The circuit depicted in Fig. 2d is essentially the same as the circuits that have been heretofore described, again with the exception that battery 222 is connected between base and emitter with the negative terminal joined to the base. Inasmuch as the potential barrier between emitter and base that ordinarily obstructs the passage of current from emitter to collector is destroyed or at least materially reduced by this manner of connecting control battery 222 and since the collector is at a negative potential with respect to the emitter by virtue of the voltage between terminals 209 and 211, there will be relatively heavy current conduction through the transistor. It is to be noted that the potential of battery 222 need be of such a magnitude as to insure current saturation.

The above explanations have been made assuming that the circuit is operating on a half cycle over which terminal 209 is positive with respect to terminal 211. For half cycles over which terminal 211 is positive with respect to terminal 209, the operating conditions of Fig. 2a and Fig. 2b will be interchanged inasmuch as the effective emitter and collector-terminals will be interchanged; likewise, the operating conditions of Figs. 2c and 2d will be interchanged. When transistors are used having symmetrical characteristics such as described in section III of the article by G. C. Sziklai, "Symmetrical Properties of Transistors," appearing in Proc. I.R.E., July 1953, on page 717, no appreciable change in operating properties will be valid over successive half-cycles. When transistors having asymmetrical characteristics are utilized, there will be noted a change in current carrying capacity of about 40% on successive half-cycles.

While the circuits described above and the explanations thereof have been made with reference to a p-n-p type of transistor, the n-p-n type may be substituted with facility. In Figs. 2a and 2b, the polarity of control battery 222 would be reversed so that the negative terminal thereof would be connected to the base electrode. In this instance, the control battery draws away the positive charges or holes that are responsible for neutralizing the contact potential between the different types of conducting regions in an n-p-n transistor. In Figs. 2c and 2d, the positive terminal of the control battery is connected to the base.

Figure 3:
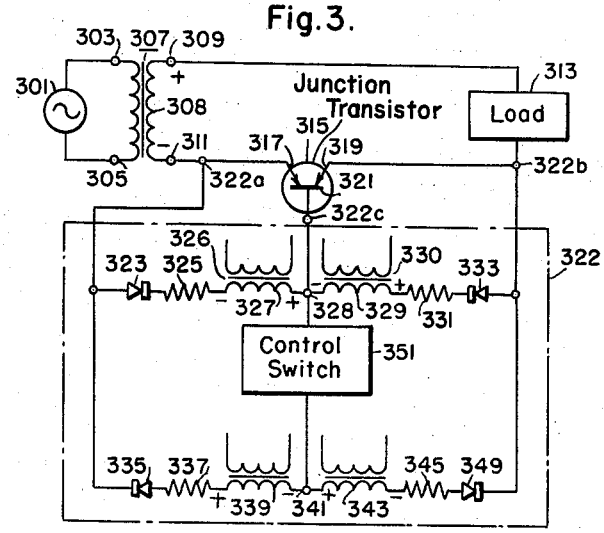
Figs. 3, 4 and 5 are circuit diagrams of preferred embodiments of our invention useful where control of bidirectional current flow is desired.

In Fig. 3 there is depicted a preferred embodiment of our invention for the control of bidirectional current flow. In this embodiment, alternating current source 301 is coupled to load 313 by transformer 307 and transistor 315 in the same manner as has been described with reference to Fig. 2a. This supply source 301 may be a conventional 60 cycle, 115 volt generator or a similar device. Transistor 315 is preferably of the type described in section III of the article by G. C. Sziklai, supra, Properties. This type of transistor is characterized by the fact that both of the terminal electrodes 317, 319 may serve as either emitter or collector without substantial change in transistor characteristics.

Supply source 301 is connected to primary terminals 303 and 305 of transformer 307 in the same manner as in Fig. 2. The output voltage across secondary terminals 309 and 311 of transformer 307 must not be so great as to produce a voltage across transistor 315 such as will cause breakdown thereof. Load 313, one terminal of which is connected to transformer secondary terminal 309 and the other terminal of which is connected to transistor electrode 319 may conveniently be an alternating current motor, a bank of lights, or a resistance bank such as is often used for heating purposes. Transistor electrode 317 is connected to transformer secondary terminal 311.

Conduction of current between transistor electrodes 317 and 319 is controlled by control circuit 322 having output terminals 322a and 322b respectively connected to transistor terminal electrodes 317 and 319 and output terminal 322c connected to base electrode 321. The portion of control circuit 322 that is operative to cut off the flow of current through transistor 315 comprises half wave rectifier 323, resistance element 325, secondary winding 327 of transformer 326, the secondary winding 329 of transformer 330, resistance element 331 and half wave rectifier 333 serially connected between terminals 322a and 322b in that order. The junction 328 of secondaries 327 and 329 is directly connected to output terminal 322c. Half wave rectifiers 323 and 333 are poled so as to oppose current flow from junction point 328 to terminals 322a and 322b, respectively.

Current conduction through transistor 315 is brought about by the circuit including half wave rectifier 335, resistance element 337, control winding 339, control winding 343, resistance element 345 and half wave rectifier 349 which are also connected between terminals 322a and 322b in the order named. Additionally, control switch 351 is connected between junction terminal 341 of control windings 339 and 343 and junction terminal 328. In this case, half wave rectifiers 335 and 349 are poled so as to oppose current flow from terminals 322a and 322b, respectively, to junction 341.

Control windings 327, 329, 339 and 343 may conveniently be wound on the core of transformer 307. If separate transformers are used as indicated in the drawing, the primaries thereof should be connected to terminals 303 and 305 so that the secondary voltages will be of the same frequency and either in phase or 180° out of phase with the voltage across terminals 309 and 311. The relative phases between the output voltages are indicated in Fig. 3.

For proper operation of the circuit, it is important that the instantaneous voltages across windings 327 and 329 be at all times greater than the voltage between terminals 311 and 309 to insure cut-off as described above with reference to Figs. 2a and 2b. Control switch 351 may be a manually operated single-pole, single-throw switch or an electronic equivalent thereof. Rectifiers 323, 333, 345 and 349 may be ordinary selenium or silicon diodes. The values of resistance elements 337 and 345 relative to resistance elements 325 and 331 must be such that the currents flowing through the transistor as a result of the voltages across windings 327 and 329 are respectively overcome by the voltages set up between the base electrode 321 and electrodes 317, 319 by windings 339 and 343, respectively, and are additionally of a sufficient magnitude to produce current saturation in transistor 315.

The operation of the embodiment of Fig. 3 is as follows. Assume first that the instantaneous voltages are as depicted in the figure and that control switch 351 is open. Under these circumstances, electrode 319 will be acting as emitter and electrode 317 will be acting as collector, and the cut-off condition described in connection with Fig. 2a will prevail. On this half cycle of operation, the portion of the circuit including control winding 329 and resistance element 331 will not affect the operation of the circuit because of the decoupling action of rectifier 333 and because the magnitude of the voltage across winding 329 is greater than that of the voltage between terminals 309 and 311. On half cycles of operation whereon instantaneous voltages are the reverse of those shown in Fig. 3, electrode 317 will be acting as emitter and electrode 319 as collector. On such half cycles of operation, the output voltage of winding 329 will be effective to cut off conduction through the transistor, the cut-off condition of Fig. 2a again prevailing.

Again assuming that the system is on the half cycle indicated in Fig. 3, with control switch 351 closed, base electrode 321 will be driven to a potential lower than that of emitter electrode 319. Current conduction through the secondary winding of transformer 307, through load 313, the emitter electrode 319, and through control circuit elements 339, 337, and 335 will be established thereby. Transistor action will now be effective to produce current around the loop defined by load 313, electrodes 319, 321 and 317 due to the voltage between terminals 309 and 311. It will be recognized that the condition of current conduction from emitter to collector described with reference to Fig. 2c is satisfied.

On half cycles of operation opposite to that pictured in the drawing and with switch 351 closed, the base electrode 321 will be driven to a negative potential with respect to electrode 317 (which electrode now will be acting as emitter). Current conduction will thereupon be established through load 313, the secondary winding of transformer 307, electrode 317 and base 321 due to the voltage across winding 343. Likewise, current will flow from electrode 317 to electrode 319 and through load 313 inasmuch as terminal 311 is positive with respect to terminal 309. Rectifier 335 will be effective to prevent winding 339 and resistance element 337 from affecting the operation of the circuit over this half cycle.

Figure 4:
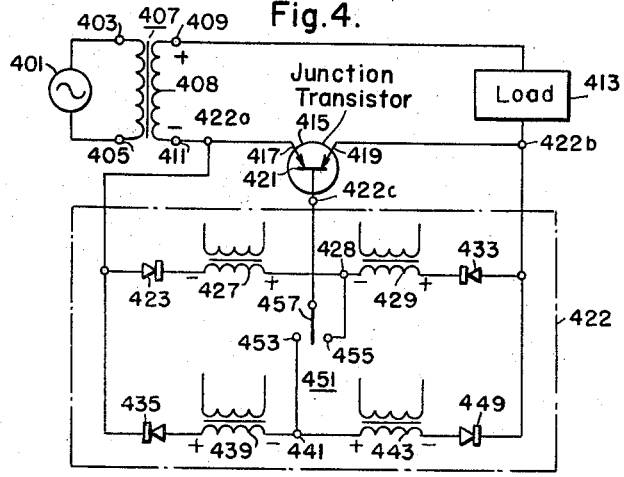

In Fig. 4, there is illustrated another embodiment of our invention which is similar in many respects to that of Fig. 3. Reference numerals in Figs. 3 and 4 wherein the last two digits correspond designate the same circuit components; for example, alternator 301, transformer 307, load 313 and symmetrical transistor 315 of Fig. 3 are respectively designated 401, 407, 413 and 415 in Fig. 4. The connections between the above designated circuit components are the same as have been described with reference to Fig. 3.

The control circuit 422 with output terminals 422a, 422b and 422c is connected to transistor 415 in the same manner as has been described with reference to transistor 315. This control circuit is the same as control circuit 322 with the following exceptions. Resistance elements 325, 331, 337 and 345 have been omitted and control switch 351 has been replaced by a single-pole, double-throw mechanical switch or the electronic equivalent thereof. Output terminal 322c, instead of being connected to junction 328 is connected to movable switch element 457 of D.P.D.T. switch 451. Terminal 455 of switch 451 is connected to junction 428 of control windings 427 and 429. The other terminal 453 of switch 451 is connected to junction 441 of control windings 439 and 443.

When it is desired to cut off the flow of current through transistor 415, switch element 457 is connected to terminal 455. The condition for cut-off described with reference to Fig. 3 will thereupon be established. Likewise, when current conduction through transistor 415 is desired, switch element 457 is connected to terminal 453. The voltages induced across control windings 439 and 443 will be operative to drive base 421 to a negative potential with respect to the other electrodes and establish current conduction through the transistor in the same manner as has been described with reference to Fig. 3. The advantage of this particular embodiment is obviously that the voltages across windings 439 and 443 are not required to overcome the currents induced by windings 427 and 429 as is necessary when the latter windings are permanently connected to base electrode 321.

Figure 5:
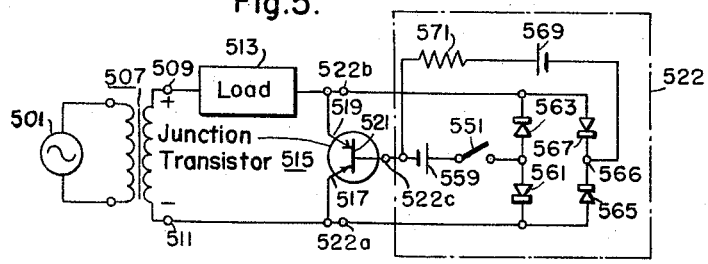

Fig. 5 presents still another embodiment of our invention, the operation of which is based upon the elemental circuit diagrams of Figs. 2a and Fig. 2c. Here again, reference numerals wherein the last two digits are identical refer to corresponding circuit elements in Figs. 3 and 5. Alternator 501 is again coupled to load 513 through transformer 507 and transistor 515. Likewise, in control circuit 522, output terminal 522a is connected to transistor electrode 517, output terminal 522b is connected to transistor electrode 519 and output terminal 522c is conneced to base electrode 521. Single phase rectifiers 565 and 567 are respectively connected to terminals 522a and 522b in such a manner as to oppose current conduction therethrough to the respective output terminals. These rectifiers have a common junction 566. For the purpose of establishing a cut-off bias on base electrode 521, a resistance element 571 and D.C. potential source 569 (conveniently a battery) are connected between output terminal 522c and junction terminal 566. The polarity of potential source 569 is such that terminal 566 is negative with respect to terminal 522c. To establish current conduction through the transistor 515, serially connected D.C. potential source 559 (again, conveniently a battery) and S.P.S.T. switch 551 are coupled to output terminals 522a and 522b by means of half-wave rectifiers 561 and 563, respectively. Rectifiers 561 and 563 are poled so as to permit current conduction from battery 559 and switch 551 to the respective output terminals.

Rectifiers 561, 563, 565 and 567 may be selenium or silicon rectifiers similar to those described with reference to Fig. 3.

In describing the operation of this circuit, it will first be assumed that it is on the half cycle of operation wherein terminal 509 is positive with respect to terminal 511. With switch 551 open, battery 569 will place base electrode 521 at a positive potential with respect to electrode 517 (which latter electrode is acting as emitter over this particular half cycle) and also with respect to electrode 519. It will be recognized that the conditions for cut-off described with reference to both Fig. 2a and Fig. 2b are satisfied. Therefore, the contact potentials at the junction of base electrode 521 with both of the "p" electrodes 517 and 519 will be operative to oppose current conduction from electrode 517 to electrode 519.

With switch 551 closed, battery 559 will be operative to place base electrode 521 at a negative potential with respect to electrode 519. Current will flow around the loop defined by rectifier 563, load 513, secondary of transformer 507, electrode 517 and base electrode 521. It will be recognized that the condition for current saturation described with reference to Fig. 2c will be satisfied and that current will flow from electrode 517 to electrode 519. On the opposite half cycle, battery 559 will place base electrode 521 at a negative potential with respect to electrode 517 and current will flow around the loop defined by rectifier 561, the secondary of transformer 507, load 513, electrode 519 and base electrode 521. The condition for current saturation described with reference to Fig. 2c will again be present and current will flow through the transistor from electrode 519 to electrode 517.

All of the embodiments described above with reference to Figs. 3, 4 and 5 have been described assuming that p-n-p type junction transistors are utilized therein. When it is dseired to utilize n-p-n type transistors, it is only necessary to reverse the polarity of each of the half-wave rectifiers and of batteries 569 and 559. The operation of the circuits will be essentially the same as described above, the base being coupled to the respective collector over a given half cycle so as to be at a negative potential with respect to the collector when cut-off is desired and at a positive potential when current saturation is desired.

Following the teachings described above, it has been found that the transistor switch has an emitter to collector impedance of less than two ohms when the control voltage is such as to produce current saturation, and an impedance of 100,000 ohms to 1 megohm when the transistor is in the cut-off condition. The power required from the control source is less than 1/60 of the power controlled thereby. It has been found that the ratio of current forced through the load when the transistor element is cut off to that when it is conducting is extremely small, as can be appreciated by the relative ohmic values set forth above.

Although the embodiments disclosed in the preceding specification are preferred, other modifications will be apparent to those skilled in the art which do not depart from the scope of the broadest aspect of the present invention.

We claim as our invention:

1. A control circuit for controlling the flow of current through a junction transistor comprising a semiconductive body having two outer zones of one conductivity type separated by an intermediate zone of the opposite conductivity type such that there exists potential barriers to current flow between each of said outer zones and said intermediate zone, said control circuit comprising: a first direct voltage means connected to said intermediate zone adapted to apply between said intermediate zone and said outer zones a voltage of the same polarity as said potential barriers; second direct voltage means connected to said intermediate zone to apply between said intermediate zone and said outer zones a voltage of the opposite polarity to said potential barriers therebetween; means connected to said first and second means to selectively couple said first and second means to said outer zones, and coupling means connected to said first and second voltage sources and said outer zones to selectively couple said voltage sources to said outer zones; said coupling means including first and second single-phase rectifier means respectively connected in series across said outer zones and poled to oppose current flow from said outer zones; and switch means for selectively connecting said second direct voltage source means to the junction of said first and second rectifier means; third and fourth single-phase rectifier means connected in series between said outer zones and poled to oppose current flow from the junction thereof to said outer zones, said first direct voltage source being connected between the junction of said third and fourth rectifier means and said intermediate zone.

2. A control circuit for controlling the flow of current through a junction transistor comprising a semiconductive body having two outer zones of one conductivity type separated by an intermediate zone of the opposite conductivity type such that potential barriers to the passage of electric charges from said outer zones to said intermediate zone are formed at the junction of said zones, said control circuit comprising direct voltage source means the positive terminal of which is coupled to said intermediate zone, first and second rectifier means coupling the negative terminal of said direct voltage source means to said outer zones polarized so as to permit current flow only from said outer zones to said base through said direct voltage source means; second direct voltage source means the negative terminal of which is coupled to said intermediate zone, and third and fourth rectifier means coupling said outer zones to said second direct voltage source means.

References Cited in the file of this patent

UNITED STATES PATENTS

| | | |
|---|---|---|
| 2,584,990 | Dimond | Feb. 12, 1952 |
| 2,604,496 | Hunter | July 22, 1952 |
| 2,627,039 | MacWilliams | Jan. 27, 1953 |
| 2,665,845 | Trent | Jan. 12, 1954 |
| 2,691,073 | Lowman | Oct. 5, 1954 |
| 2,728,857 | Sziklai | Dec. 27, 1955 |
| 2,763,832 | Schockley | Sept. 18, 1956 |